(12) United States Patent
Tanaka et al.

(10) Patent No.: US 10,397,698 B2
(45) Date of Patent: Aug. 27, 2019

(54) AUDIO DEVICE AND METHOD OF CONTROLLING AUDIO DEVICE

(71) Applicant: Yamaha Corporation, Hamamatsu-shi, Shizuoka (JP)

(72) Inventors: Katsuaki Tanaka, Hamamatsu (JP); Masahiro Ishida, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/652,294

(22) Filed: Jul. 18, 2017

(65) Prior Publication Data

US 2017/0318386 A1  Nov. 2, 2017

Related U.S. Application Data

(63) Continuation of application No. PCT/JP2016/069693, filed on Jul. 1, 2016.

(30) Foreign Application Priority Data

Aug. 19, 2015  (JP) .................................. 2015-162330

(51) Int. Cl.
*H04B 3/00* (2006.01)
*H02B 1/00* (2006.01)
(Continued)

(52) U.S. Cl.
CPC .............. *H04R 3/00* (2013.01); *G06F 3/165* (2013.01); *H04B 1/40* (2013.01); *H04W 4/80* (2018.02);
(Continued)

(58) Field of Classification Search
CPC ........ H04R 3/00; H04R 5/04; H04R 2420/01; H04R 2420/07; G06F 3/165
(Continued)

(56) References Cited

U.S. PATENT DOCUMENTS 7,352,993 B2 *  4/2008  Andoh .................. H04B 1/082
                                                        360/55
2006/0132382 A1  6/2006  Jannard
(Continued)

FOREIGN PATENT DOCUMENTS

JP  2008-92546 A  4/2008
JP  2013-62580 A  4/2013
JP  2015-53550 A  3/2015

OTHER PUBLICATIONS

International Preliminary Report on Patentability (PCT/IB/338 & PCT/IB/373) issued in PCT Application No. PCT/JP2016/069693 dated Mar. 1, 2018, including English translation of document C2 (Japanese-language Written Opinion (PCT/ISA/327 previously filed on Jul. 18, 2017)) (six (6) pages).

(Continued)

*Primary Examiner* — Xu Mei
(74) *Attorney, Agent, or Firm* — Crowell & Moring LLP (57) ABSTRACT

Provided is an audio device, including: an audio signal communication unit comprising a reception unit configured to receive an audio signal via wireless communication and a transmission unit configured to transmit an audio signal via wireless communication; a plurality of signal input units including the reception unit; an input selection unit configured to select one signal input unit from among the plurality of signal input units; a control unit configured to control switching of the input selection unit; and a signal processing unit, in which the control unit is configured to: switch, when the input selection unit has selected a signal input unit other than the reception unit, the input selection unit to the selected signal input unit and input an audio signal, which is input from the selected signal input unit, into the signal processing unit; and switch, when the reception unit has received an audio signal via wireless communication, the (Continued)

input selection unit from the selected signal input unit to the reception unit and input the received audio signal into the signal processing unit.

11 Claims, 6 Drawing Sheets

(51) Int. Cl.
*H04R 3/00* (2006.01)
*H04B 1/40* (2015.01)
*H04W 4/80* (2018.01)
*G06F 3/16* (2006.01)

(52) U.S. Cl.
CPC ...... *H04R 2420/01* (2013.01); *H04R 2420/07* (2013.01)

(58) Field of Classification Search
USPC .......................................... 381/77, 79, 123
See application file for complete search history.

(56) References Cited

U.S. PATENT DOCUMENTS

| 2008/0063216 | A1 | 3/2008 | Sakata et al. |
| 2013/0064393 | A1* | 3/2013 | Yamazaki ................ H04R 5/04 381/105 |
| 2013/0272553 | A1 | 10/2013 | Meier |
| 2013/0343567 | A1 | 12/2013 | Triplett et al. |

OTHER PUBLICATIONS

International Search Report (PCT/ISA/210) issued in PCT Application No. PCT/JP2016/069693 dated Sep. 13, 2016 with English translation (4 pages).
Japanese-language Written Opinion (PCT/ISA/237) issued in PCT Application No. PCT/JP2016/069693 dated Sep. 13, 2016 (3 pages).
Extended European Search Report issued in counterpart European Application No. 16836888.4 dated Feb. 12, 2019 (nine (9) pages).

* cited by examiner

AUDIO DEVICE AND METHOD OF CONTROLLING AUDIO DEVICE

CROSS-REFERENCE TO RELATED APPLICATION

This application is a continuation of PCT International Application No. PCT/JP2016/069693, filed Jul. 1, 2016, which claims priority under 35 U.S.C. § 119 from Japanese Patent Application No. JP 2015-162330, filed Aug. 19, 2015, the entire disclosure of which are herein expressly incorporated by reference in its entirety.

BACKGROUND OF THE INVENTION

1. Field of the Invention

The present invention relates to an audio device having functions of receiving and transmitting an audio signal, for example, via wireless communication, and to a method of controlling an audio device.

2. Description of the Related Art

Hitherto, various kinds of wireless communication standards, for example, Bluetooth (trademark), have been developed. Besides, there is known an audio device including a plurality of signal input units each configured to receive an audio signal in order to enable reception of audio signals from a plurality of input source devices including an input source device configured to transmit an audio signal in a wireless manner. For example, in Japanese Patent Application Laid-open No. 2015-053550, there is disclosed a speaker apparatus including a signal input unit that supports Bluetooth and LINE input.

SUMMARY OF THE INVENTION

Meanwhile, communication via Bluetooth is based on a device having a function (Bluetooth sink) of receiving a signal and a function (Bluetooth source) of transmitting a signal. The device having the function (Bluetooth source) of transmitting a signal and the device having the function (Bluetooth sink) of receiving a signal establish communication (pairing), to thereby enable transmission of an audio signal.

When one audio device includes both of the reception function and the transmission function of Bluetooth, Bluetooth can be used to perform both transmission and reception of an audio signal. However, the reception function and transmission function of Bluetooth cannot be operated at the same time. Thus, when the audio device has the functions of receiving and transmitting an audio signal, the reception function and the transmission function need to be switched.

When the user is required to complete all the setting for switching between the functions of receiving and transmitting an audio signal, the setting may become complicated and usability of both of the functions may deteriorate.

The present invention has an object to provide an audio device having functions of receiving and transmitting an audio signal, for example, via wireless communication, and enabling switching between both of the functions easily, and to provide a method of controlling an audio device.

According to one embodiment of the present invention, there is provided an audio device including: an audio signal communication unit including a reception unit configured to receive an audio signal via wireless communication and a transmission unit configured to transmit an audio signal via wireless communication; a plurality of signal input units including the reception unit; an input selection unit configured to select one signal input unit from among the plurality of signal input units; a control unit configured to control switching of the input selection unit; and a signal processing unit, in which the control unit is configured to: switch, when the input selection unit has selected a signal input unit other than the reception unit, the input selection unit to the selected signal input unit and input an audio signal, which is input from the selected signal input unit, into the signal processing unit; and switch, when the reception unit has received an audio signal via wireless communication, the input selection unit from the selected signal input unit to the reception unit and input the received audio signal into the signal processing unit.

According to one embodiment of the present invention, there is provided a method of controlling an audio device, the audio device including: an audio signal communication unit including a reception unit configured to receive an audio signal via wireless communication and a transmission unit configured to transmit an audio signal via wireless communication; a plurality of signal input units including the reception unit; an input selection unit configured to select one signal input unit from among the plurality of signal input units; a control unit configured to control switching of the input selection unit; and a signal processing unit, the method including: switching, by the controller, when the input selection unit has selected a signal input unit other than the reception unit, the input selection unit to the selected signal input unit and inputting an audio signal, which is input from the selected signal input unit, into the signal processing unit; and switching, by the controller, when the reception unit has received an audio signal via wireless communication, the input selection unit from the selected signal input unit to the reception unit and inputting the received audio signal into the signal processing unit.

According to another embodiment of the present invention, there is provided an audio device including: an audio signal communication unit including a reception unit configured to receive an audio signal via wireless communication and a transmission unit configured to transmit an audio signal via wireless communication, the reception unit and the transmission unit each being capable of being switched on/off; a plurality of signal input units including the reception unit; an input selection unit configured to select one signal input unit from among the plurality of signal input units; a transmission function switch unit configured to receive an instruction to switch on/off of the transmission unit; a control unit configured to control switching of on/off of each of the reception unit and the transmission unit and switching of the input selection unit; and a signal processing unit, in which the control unit is configured to: switch, when the input selection unit has selected a signal input unit other than the reception unit and the transmission function switch unit has received an instruction to set the transmission unit off, the input selection unit to the selected signal input unit and input an audio signal, which is input from the selected signal input unit, into the signal processing unit; and set the reception unit on, switch, when the reception unit has received an audio signal via wireless communication, the input selection unit from the selected signal input unit to the reception unit, and input the received audio signal into the signal processing unit.

In the above-mentioned invention, the control unit may be configured to set, when the input selection unit has selected the reception unit, the reception unit on irrespective of whether or not the transmission function switch unit has received an instruction to set the transmission unit on/off, and input an audio signal received by the reception unit into the signal processing unit.

In the above-mentioned invention, the control unit may be configured to set, when the input selection unit has selected a signal input unit other than the reception unit and the transmission function switch unit has been operated to set the transmission unit on, the transmission unit on, switch the input selection unit to the selected signal input unit, input an audio signal, which is input from the selected signal input unit, into the signal processing unit, and input the audio signal into the transmission unit, and the transmission unit may be configured to transmit the audio signal via wireless communication.

In the above-mentioned invention, the signal processing unit may include a speaker, and may be configured to emit a sound of an input audio signal using the speaker.

In the above-mentioned invention, the transmission function switch unit may be configured to receive the instruction to set the transmission unit on/off from a control terminal via wireless communication.

DETAILED DESCRIPTION OF THE INVENTION

Figure 1:
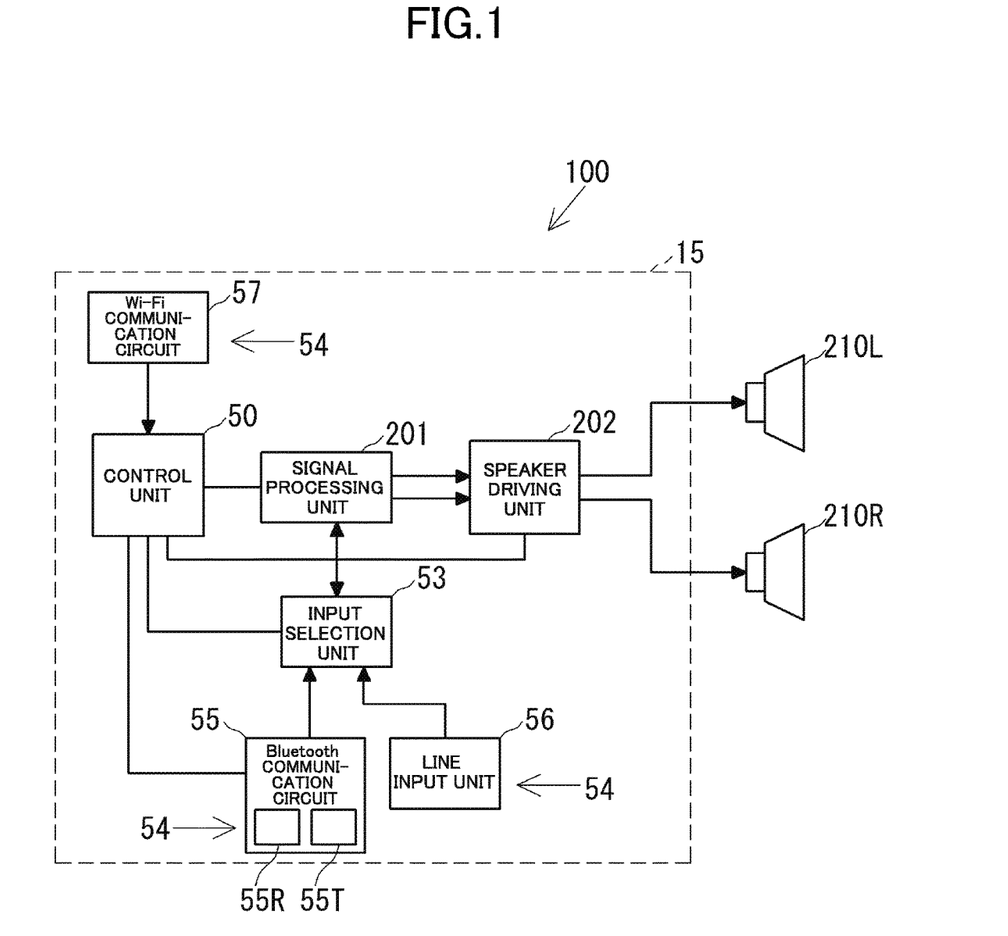
FIG. 1 is a block diagram for illustrating a speaker apparatus.

Now, a description is given of a speaker apparatus 100 according to an embodiment of the present invention with reference to the drawings. FIG. 1 is a block diagram of the speaker apparatus 100. The speaker apparatus 100 includes left and right speaker units 210L and 210R and an electronic circuit 15. The electronic circuit 15 includes a control unit 50, a signal processing unit 201, a speaker driving unit 202, an input selection unit 53, and a plurality of signal input units 54.

The signal input units 54 are each configured to receive an audio signal from an external input source device. In this embodiment, the signal input units 54 include a Bluetooth (hereinafter sometimes abbreviated as BT) communication circuit 55, a LINE input unit 56, and a Wi-Fi communication circuit 57.

The LINE input unit 56 includes a connector, for example, an audio mini jack, and an A/D conversion circuit. The terminal of an audio cable connected to an output terminal of another audio device is plugged into the connector. The LINE input unit 56 is configured to convert an audio signal, which is input from outside via an audio cable, into a digital signal using the A/D conversion circuit, and then input this signal into the input selection unit 53. When the connector is a digital connector, for example, an optical fiber, the A/D conversion circuit is unnecessary.

The Bluetooth communication circuit 55 has functions of transmitting and receiving an audio signal via Bluetooth wireless communication. Specifically, the Bluetooth communication circuit 55 includes a transmission unit 55T and a reception unit 55R as its functions. The transmission unit 55T and the reception unit 55R of the Bluetooth communication circuit 55 can each be switched on/off, but both of those units cannot be switched on at the same time. The Bluetooth communication circuit 55 corresponds to an audio signal communication unit of the present invention.

The Bluetooth communication circuit 55 (reception unit 55R thereof) and the LINE input unit 56 are connected to the input selection unit 53. The input selection unit 53 is configured to select any one of the Bluetooth communication circuit 55 and the LINE input unit 56 through a selection signal input from the control unit 50. Then, the input selection unit 53 outputs an audio signal, which is input from the selected Bluetooth communication circuit 55 or LINE input unit 56, to the signal processing unit 201.

The control unit 50 is formed of a microcomputer. The Wi-Fi communication circuit 57 is connected to the control unit 50. The Wi-Fi communication circuit 57 is configured to receive a command from a device, for example, a mobile terminal (e.g., multifunctional mobile phone (smartphone) and tablet computer) having a remote controller function, and input the command into the control unit 50. The control unit 50 is configured to set the signal processing unit 201 or perform switching of the input selection unit 53 based on a command input from the Wi-Fi communication circuit 57. Further, the control unit 50 is configured to switch on/off of the reception unit 55R of the Bluetooth communication circuit 55 and switch on/off of the transmission unit 55T of the Bluetooth communication circuit 55 based on the command input from the Wi-Fi communication circuit 57. Instead, the control unit 50 may be configured to acquire a command based on an instruction input by the user via, for example, a button or a touch panel included in the speaker apparatus 100.

The signal processing unit 201 is configured to adjust a sound quality of the audio signal input from the input selection unit 53, and output it to the speaker driving unit 202 as an audio signal. The speaker driving unit 202 includes an amplifier, and is configured to amplify the audio signal input from the signal processing unit 201 and output the amplified signal to each of the speaker units 210L and 210R.

Figure 2:
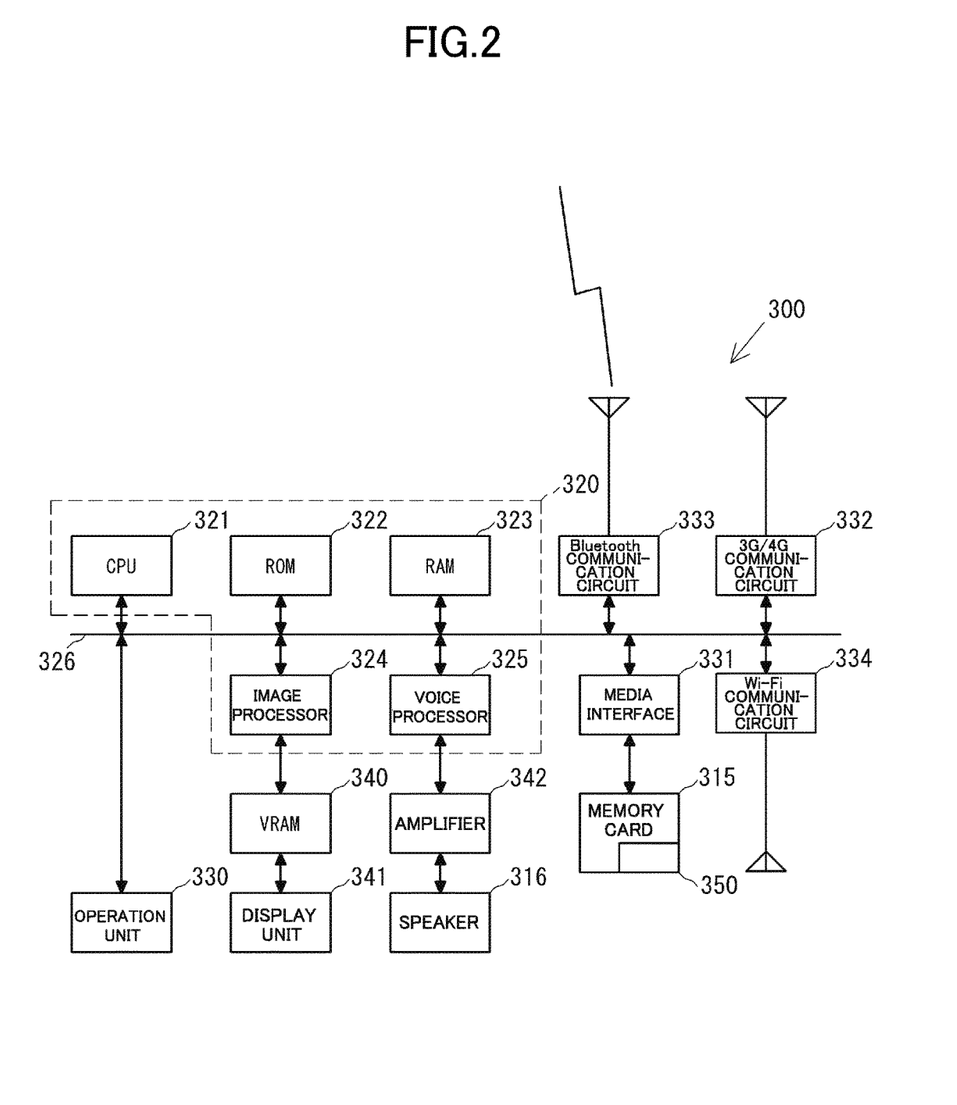
FIG. 2 is a block diagram for illustrating a multifunctional mobile phone that functions as a remote controller of the speaker apparatus.

FIG. 2 is a block diagram for illustrating a multifunctional mobile phone (hereinafter simply referred to as "mobile phone") that functions as a remote controller of the speaker apparatus 100. A mobile phone 300 includes an audio device controller application program 350. When the audio device controller application program 350 is executed, the mobile phone 300 communicates to/from the speaker apparatus 100 via Wi-Fi, and performs setting of the speaker apparatus 100. The mobile phone 300, in which the audio device controller application program 350 is being executed, forms an audio device controller from the functional point of view.

As illustrated in FIG. 2, the mobile phone 300 includes, on a bus 326, a control unit 320, an operation unit 330, a media interface 331, a 3G/4G communication circuit 332, a Bluetooth communication circuit 333, and a Wi-Fi communication circuit 334. The control unit 320 includes a CPU 321, a ROM (flash memory) 322, a RAM 323, an image processor 324, and a voice processor 325. A video RAM (VRAM) 340 is connected to the image processor 324, and a display unit 341 is connected to the VRAM 340. The display unit 341 contains a liquid crystal display, and is configured to display, for example, a standby screen or a phone number. Further, the screen (refer to FIG. 3) of the audio device controller is also displayed on the display unit 341. An amplifier 342 including a D/A converter is connected to the voice processor 325, and a speaker 316 is connected to the amplifier 342.

Figure 3:
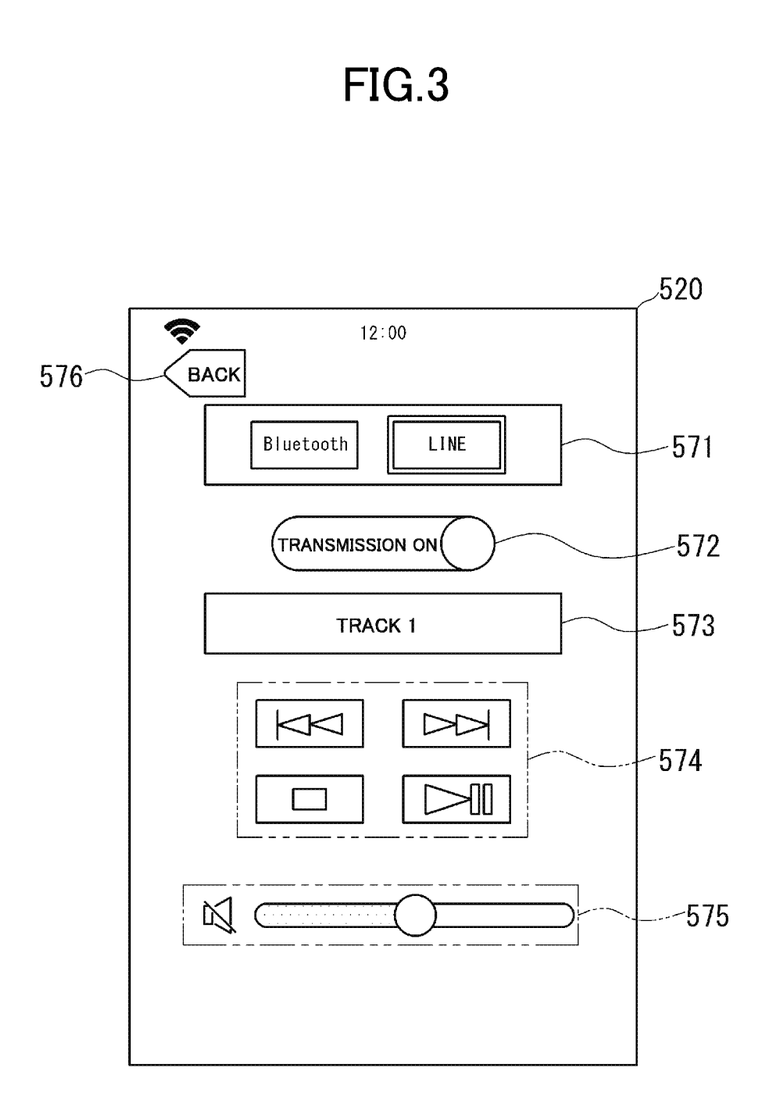
FIG. 3 is a diagram for illustrating a reproduction screen to be displayed on a display unit of the mobile phone that functions as an audio device controller.

The image processor 324 includes a graphics processing unit (GPU) configured to generate various kinds of images such as a standby screen or a phone number. When the audio device controller application program 350 is activated, the image processor 324 generates an image of the audio device controller as illustrated in FIG. 3 in accordance with an instruction from the CPU 321, and places the image on the VRAM 340. The image placed on the VRAM 340 is displayed on the display unit 341.

The voice processor 325 includes a digital signal processor configured to encode/decode a telephone voice. The voice processor 325 outputs the decoded/generated voice to the amplifier 342. The amplifier 342 amplifies the voice signal for output to the speaker 316.

The ROM 322 or the memory card 315 stores an audio file (e.g., mp3) of music. The voice processor 325 reads, decodes, and reproduces this file. The amplifier 342 amplifies the reproduced music (audio signal) and the speaker 316 emits the sound of the music. In other cases, the sound is transmitted to a communication partner device (e.g., speaker apparatus 100) by the Bluetooth communication circuit 333.

The 3G/4G communication circuit 332 is configured to perform a voice call and data communication via a mobile phone communication network. An application program, for example, an audio device controller, is downloaded through data communication. Acquisition of an application program is not limited to downloading through 3G/4G communication, and may be performed via an interface such as Wi-Fi communication and USB.

The Bluetooth communication circuit 333 is configured to communicate to/from a (paired) device that is selected and set as a partner apparatus. For example, the Bluetooth communication circuit 333 transmits an audio signal of music stored in a memory of the mobile phone 300 to the audio device, for example, the speaker apparatus 100.

The Wi-Fi communication circuit 334 is configured to communicate to/from a wireless access point (not shown) in a wireless manner based on the IEEE 802.11g standard. The Wi-Fi communication circuit 334 communicates to/from the speaker apparatus 100 via the wireless access point. The mobile phone 300 functions as an audio device controller in cooperation with the audio device controller application program 350. Specifically, the mobile phone 300 communicates to/from the speaker apparatus 100, and transmits a command signal relating to the setting of the speaker apparatus 100 and an audio signal of music.

The operation unit 330 contains a touch panel formed on the display unit 341, and is configured to detect a touch operation and a flick operation on the touch panel. The memory card 315 is connected to the media interface 331. The memory card 315 is, for example, a micro SD card. An application program is downloaded from a server by the 3G/4G communication circuit 332, and then stored into the memory card 315 or the ROM 322. In this mobile phone 300, the audio device controller application program 350 is stored in the memory card 315. The audio device controller application program 350 contains data necessary for execution of the program in addition to the program itself.

A basic program for executing a telephone call or an application program of the mobile phone 300 is stored in the ROM 322. Further, the ROM 322 is a flash memory, and can store downloaded application programs and other pieces of data in addition to the basic program. A work area to be used when the CPU 320 executes the audio device controller application program 350 is set in the RAM 323.

The mobile phone 300 forms an audio device controller in cooperation with the audio device controller application program 350 stored in the memory card 315, and transmits a message to the speaker apparatus 100 via Wi-Fi, to thereby control the speaker apparatus 100.

FIG. 3 is a diagram for illustrating a reproduction screen 520 to be displayed on the display unit 341 of the mobile phone 300 that functions as an audio device controller. In the reproduction screen 520, an audio source selection button 571, an on/off switch button 572 for the transmission unit 55T of the Bluetooth communication circuit 55, a music selection button 573, a reproduction button 574, a volume setting slider 575, and a back button 576 are displayed.

The audio source selection button 571 is an operator for selecting Bluetooth or LINE input as an input source (signal input unit that receives an audio signal). Icons of Bluetooth and LINE input are displayed in the audio source selection button 571 as selectable input sources. When the user taps the icon of Bluetooth or LINE input, a command message for indicating a selection of an input source corresponding to the tapped icon is transmitted to the speaker apparatus 100, and the tapped icon is displayed in such a manner that the icon is selected and active. In FIG. 3, LINE input is selected as the input source. When another input, for example, Wi-Fi, can be selected as the input source, an icon corresponding to the input may be displayed.

The on/off switch button 572 is an operator for switching on/off of the transmission unit 55T of the Bluetooth communication circuit 55. When a slider is moved rightward, a command message to the effect that the transmission unit 55T of the Bluetooth communication circuit 55 needs to be set on is transmitted to the speaker apparatus 100. When the slider is moved leftward, a command message to the effect that the transmission unit 55T of the Bluetooth communication circuit 55 needs to be set off is transmitted to the speaker apparatus 100. The on/off switch button 572 corresponds to a transmission function switch unit of the present invention.

When LINE input is selected as the input source and the transmission unit 55T of the Bluetooth communication circuit 55 is set on as illustrated in FIG. 3, an audio signal input through LINE input is transmitted to another audio device via Bluetooth.

The number of a song input through LINE input is displayed on the music selection button 573.

The reproduction button 574 contains an operator for reproducing music or temporarily stopping reproduction of the music, an operator for skipping the reproduced music to a next music, and an operator for skipping to the start of the reproduced music.

The volume setting slider 575 is an operator for setting a volume value (Vol) of a sound emitted by the speaker apparatus 100.

When the back button 576 is tapped, the content set at that time (e.g., state of LINE input being selected as signal input unit 54, on/off state of Bluetooth transmission function, and value of volume setting slider 575) is stored, and the screen formed on the display unit 341 is returned to a top screen.

Figure 4:
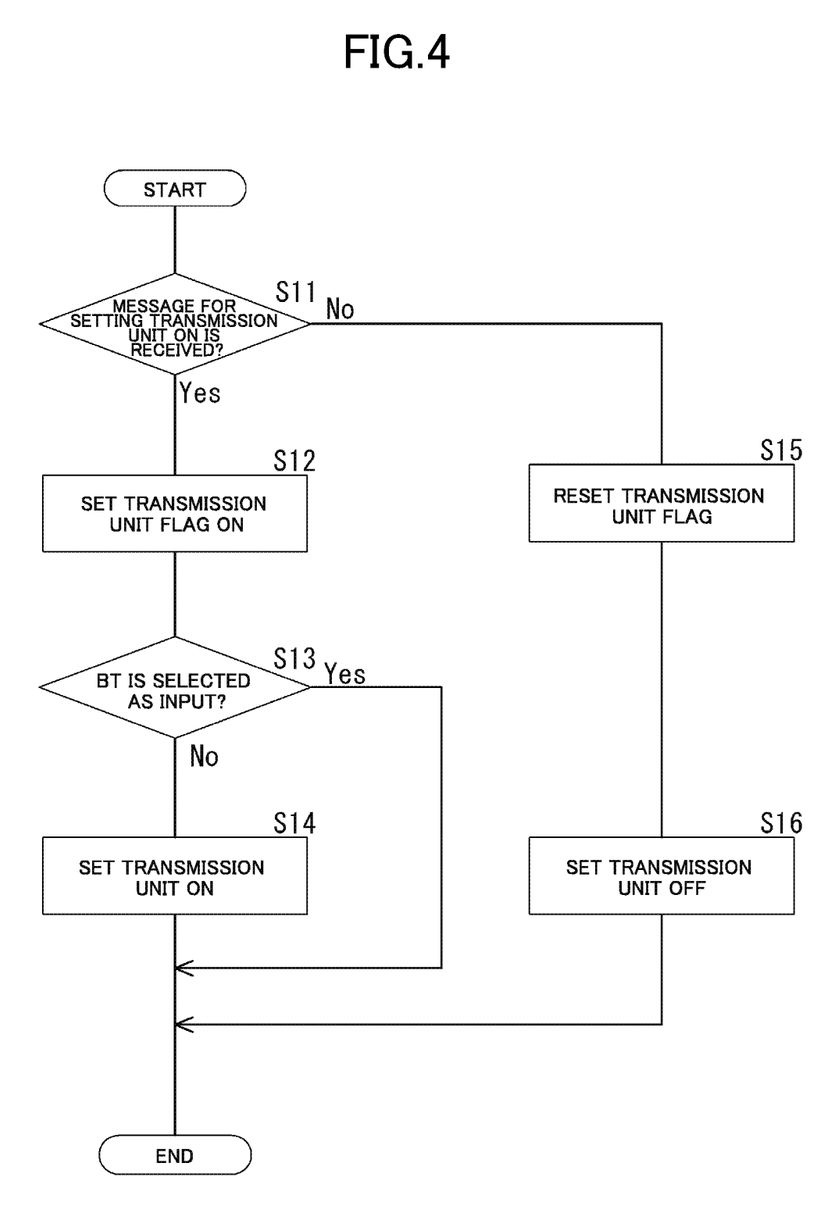
FIG. 4 is a flow chart for illustrating an operation of selecting on/off of a transmission unit of a Bluetooth communication circuit.
Figure 5:
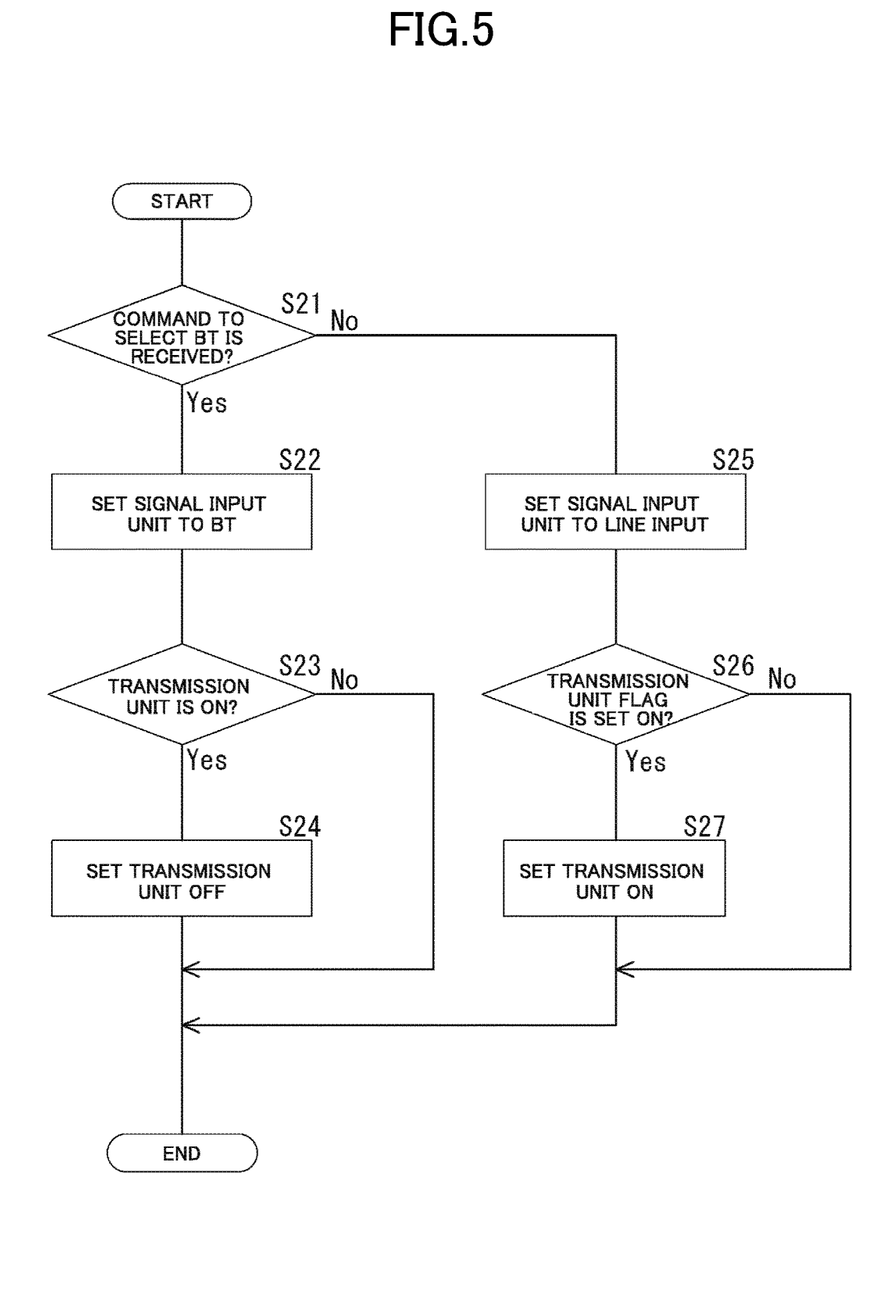
FIG. 5 is a flowchart for illustrating a switching operation performed by an input selection unit, namely, an operation of selecting a signal input unit.

FIG. 4 is a flow chart for illustrating an operation of selecting on/off of the transmission unit 55T of the Bluetooth communication circuit 55. FIG. 5 is a flowchart for illustrating a switching operation performed by the input selection unit 53, namely, an operation of selecting the signal input unit 54. Now, an operation of selecting Bluetooth or LINE input as the signal input unit 54 and an operation of selecting on/off of the transmission unit 55T of the Bluetooth communication circuit 55 are described with reference to the flowcharts of FIG. 4 and FIG. 5.

The control unit 50 of the speaker apparatus 100 regularly confirms a command message from the mobile phone 300 (audio device controller), and when the control unit 50 receives a command message to the effect that the transmission unit 55T of the Bluetooth communication circuit 55 needs to be set on/off, the control unit 50 executes a processing operation of FIG. 4. When the control unit 50 receives a message for setting the transmission unit 55T on (YES in Step S11), the control unit 50 sets a transmission unit flagon to indicate the fact that a command to set the transmission unit 55T on is received (Step S12), and determines whether or not the input selection unit 53 has selected Bluetooth as the signal input unit 54 (Step S13).

When the selected signal input unit 54 is not Bluetooth (NO in Step S13), the control unit 50 instructs the Bluetooth communication circuit 55 to set the transmission unit 55T on (Step S14) and ends this processing operation. When the selected signal input unit 54 is Bluetooth (YES in Step S13), the selected signal input unit 54 ends this processing operation immediately (without setting transmission unit 55T on).

On the contrary, when the control unit 50 receives a message for setting the transmission unit 55T off (NO in Step S11), the control unit 50 resets the transmission unit flag (Step S15), and instructs the Bluetooth communication circuit 55 to set the transmission unit 55T off (Step S16) to end this processing operation.

Further, when the control unit 50 receives a switch command for the input selection unit 53 from the mobile phone 300 (audio device controller), the control unit 50 executes a processing operation of FIG. 5. When the control unit 50 receives a command to select Bluetooth as the signal input unit 54 (YES in Step S21), the control unit 50 instructs the input selection unit 53 to set the signal input unit 54 to Bluetooth (Step S22), and determines whether or not the transmission unit 55T of the Bluetooth communication circuit 55 is on (Step S23). When the transmission unit 55T is on (YES in Step S23), the control unit 50 instructs the Bluetooth communication circuit 55 to set the transmission unit 55T off (Step S24), and ends this processing operation. When the transmission unit 55T is off (NO in Step S23), the transmission unit 55I is off and the control unit 50 ends this processing operation immediately.

On the contrary, when the control unit 50 receives a command to select LINE input as the signal input unit 54 (NO in Step S21), the control unit 50 instructs the input selection unit 53 to set the signal input unit 54 to LINE input (Step S25), and determines whether or not the transmission unit flag is set on (Step S26). When the transmission unit flag is set on (YES in Step S26), the control unit 50 instructs the Bluetooth communication circuit 55 to set the transmission unit 55T on (Step S27), and ends this processing operation immediately. When the transmission unit flag is not set on (NO in Step S26), the control unit 50 ends this processing operation immediately.

Figure 6:
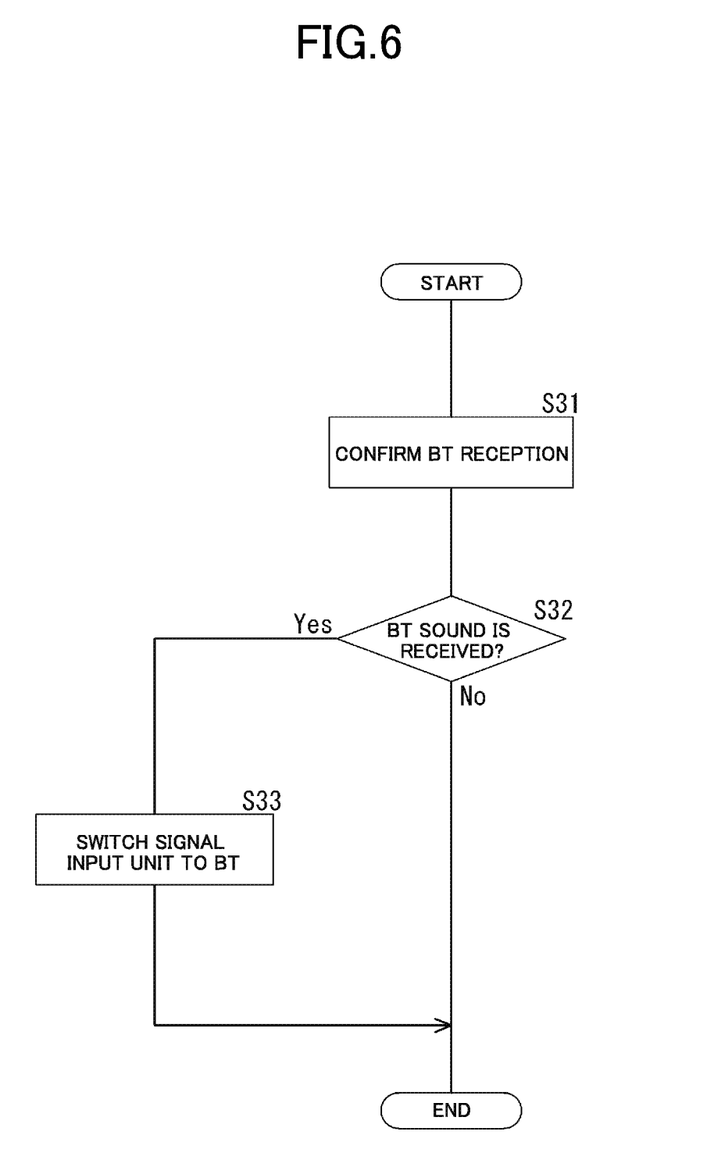
FIG. 6 is a flow chart for illustrating an operation of the speaker apparatus in a state in which LINE input is selected as the signal input unit and the transmission unit of the Bluetooth communication circuit is set to off.

FIG. 6 is a flow chart for illustrating an operation of the control unit 50 of the speaker apparatus 100 in a state in which LINE input is selected as the signal input unit 54 and the transmission unit 55T of the Bluetooth communication circuit 55 is set to off. LINE input is selected, and thus the speaker apparatus 100 emits the sound of an audio signal input from the LINE input unit 56 using the speakers 210L and 210R. In parallel to this, the Bluetooth communication circuit 55 is waiting and ready to receive an audio signal via Bluetooth. This operation is executed repeatedly every short period of time (e.g., 20 milliseconds).

The control unit 50 confirms whether or not an audio signal is input via Bluetooth (Step S31), and determines whether or not an audio signal is input via Bluetooth (Step S32). When the reception unit 55R of the Bluetooth communication circuit 55 receives an audio signal (YES in Step S32), the control unit 50 instructs the input selection unit 53 to switch the signal input unit 54 from LINE input to Bluetooth (Step S33). With this, the speaker units 210L and 210R emit the sound of an audio signal via Bluetooth. When the reception unit 55R of the Bluetooth communication circuit 55 does not receive an audio signal (NO in Step S32), the control unit 50 ends this processing operation immediately. In Step S32, the positive determination may be made not only based simply on reception of an audio signal via Bluetooth, but also based on a condition that the audio signal has a sound volume of a predetermined level or more.

In short, the speaker apparatus 100 monitors input via Bluetooth even when LINE input is selected, and when there is input of an audio signal via Bluetooth, the speaker apparatus 100 switches the input selection unit 53 from LINE input to Bluetooth, and emits the sound of the audio signal thereof. That is, Bluetooth is prioritized over LINE input.

In this embodiment, the speaker apparatus 100 including the speaker 210 is illustrated as an audio device, but the audio device according to the present invention is not limited thereto. It suffices that a plurality of audio sources including Bluetooth are selectable in the audio device. Further, the selectable audio sources are not limited to Bluetooth and LINE input. The Wi-Fi communication circuit 57 may be one of the selectable audio sources. Further, the audio device may also have a tuner or a media player function. The instruction reception unit in the appended claims corresponds to, for example, the Wi-Fi communication circuit 57.

While there have been described what are at present considered to be certain embodiments of the invention, it will be understood that various modifications may be made thereto, and it is intended that the appended claims coverall such modifications as fall within the true spirit and scope of the invention.

What is claimed is:

1. An audio device, comprising:
   an audio signal communication unit comprising a reception unit configured to receive an audio signal via wireless communication and a transmission unit configured to transmit an audio signal via wireless communication;
   a plurality of signal input units comprising the reception unit;
   an input selection unit configured to select one signal input unit from among the plurality of signal input units;
   a control unit configured to control switching of the input selection unit;
   a signal processing unit,
   wherein the control unit is configured to:
      switch, when the input selection unit has selected a signal input unit other than the reception unit, the input selection unit to the selected signal input unit and input an audio signal, which is input from the selected signal input unit, into the signal processing unit; and switch, when the reception unit has received an audio signal via wireless communication, the input selection unit from the selected signal input unit to the reception unit and input the received audio signal into the signal processing unit; and an instruction reception unit configured to receive an instruction to set the transmission unit on/off, wherein the reception unit and the transmission unit are each capable of being switched on/off, and wherein the control unit is configured to:

control switching of on/off of each of the reception unit and the transmission unit;

switch, when the input selection unit has selected a signal input unit other than the reception unit and the instruction reception unit is instructed to set the transmission unit off, the input selection unit to the selected signal input unit, input an audio signal, which is input from the selected signal input unit, into the signal processing unit, and set the reception unit on; and switch, when the reception unit has received an audio signal via wireless communication and the reception unit is on, the input selection unit from the selected signal input unit to the reception unit and input the received audio signal into the signal processing unit.

2. The audio device according to claim 1, wherein the control unit is configured to set, when the input selection unit has selected the reception unit, the reception unit on irrespective of whether or not the instruction reception unit is instructed to set the transmission unit on/off, and input an audio signal received by the reception unit into the signal processing unit.

3. The audio device according to claim 1, wherein the control unit is configured to set, when the input selection unit has selected a signal input unit other than the reception unit and the instruction reception unit has received an instruction to set the transmission unit on, the transmission unit on, switch the input selection unit to the selected signal input unit, input an audio signal, which is input from the selected signal input unit, into the signal processing unit, and input the audio signal into the transmission unit, and wherein the transmission unit is configured to transmit the audio signal via wireless communication.

4. The audio device according to claim 1, further comprising a speaker, wherein the audio device is configured to emit a sound of an input audio signal using the speaker.

5. The audio device according to claim 1, wherein the instruction reception unit is configured to receive the instruction to set the transmission unit on/off from a control terminal via wireless communication.

6. The audio device according to claim 1, wherein on/off states of the reception unit and the transmission unit comprise states other than a state of both of the reception unit and the transmission unit being on.

7. A method of controlling an audio device, the audio device comprising:

an audio signal communication unit comprising a reception unit configured to receive an audio signal via wireless communication and a transmission unit configured to transmit an audio signal via wireless communication;

a plurality of signal input units comprising the reception unit;

an input selection unit configured to select one signal input unit from among the plurality of signal input units;

a control unit configured to control switching of the input selection unit;

a signal processing unit; and an instruction reception unit configured to receive an instruction to set the transmission unit on/off, wherein the reception unit and the transmission unit are each capable of being switched on/off, the method comprising:

switching, by the controller, when the input selection unit has selected a signal input unit other than the reception unit, the input selection unit to the selected signal input unit and inputting an audio signal, which is input from the selected signal input unit, into the signal processing unit;

switching, by the controller, when the reception unit has received an audio signal via wireless communication, the input selection unit from the selected signal input unit to the reception unit and inputting the received audio signal into the signal processing unit; and receiving, via the instruction reception unit, an instruction to set the transmission unit on/off, wherein the method further comprises:

controlling, by the controller, switching of on/off of each of the reception unit and the transmission unit;

switching, by the controller, when the input selection unit has selected a signal input unit other than the reception unit and the instruction reception unit is instructed to set the transmission unit off, the input selection unit to the selected signal input unit, inputting an audio signal, which is input from the selected signal input unit, into the signal processing unit, and setting the reception unit on; and switching, by the controller, when the reception unit has received an audio signal via wireless communication and the reception unit is on, the input selection unit from the selected signal input unit to the reception unit and inputting the received audio signal into the signal processing unit.

8. The method of controlling an audio device according to claim 7, further comprising setting, by the control unit, when the input selection unit has selected the reception unit, the reception unit on irrespective of whether or not the instruction reception unit is instructed to set the transmission unit on/off, and inputting an audio signal received by the reception unit into the signal processing unit.

9. The method of controlling an audio device according to claim 7, further comprising:

setting, by the control unit, when the input selection unit has selected a signal input unit other than the reception unit and the instruction reception unit has received an instruction to set the transmission unit on, the transmission unit on, switching the input selection unit to the selected signal input unit, inputting an audio signal, which is input from the selected signal input unit, into the signal processing unit, and inputting the audio signal into the transmission unit; and transmitting, by the transmission unit, the audio signal via wireless communication.

10. The method of controlling an audio device according to claim 7, wherein the audio device further comprises a speaker, and wherein the method further comprises emitting, by the audio device, a sound of an input audio signal using the speaker.

11. The method of controlling an audio device according to claim 7, further comprising receiving, by the instruction reception unit, the instruction to set the transmission unit on or off from a control terminal via wireless communication.

\* \* \* \* \*